Aug. 29, 1933.   H. J. WOOCK   1,924,530
PRESSURE BAG FOR TIRE MOLDS
Filed June 30, 1931   4 Sheets-Sheet 1
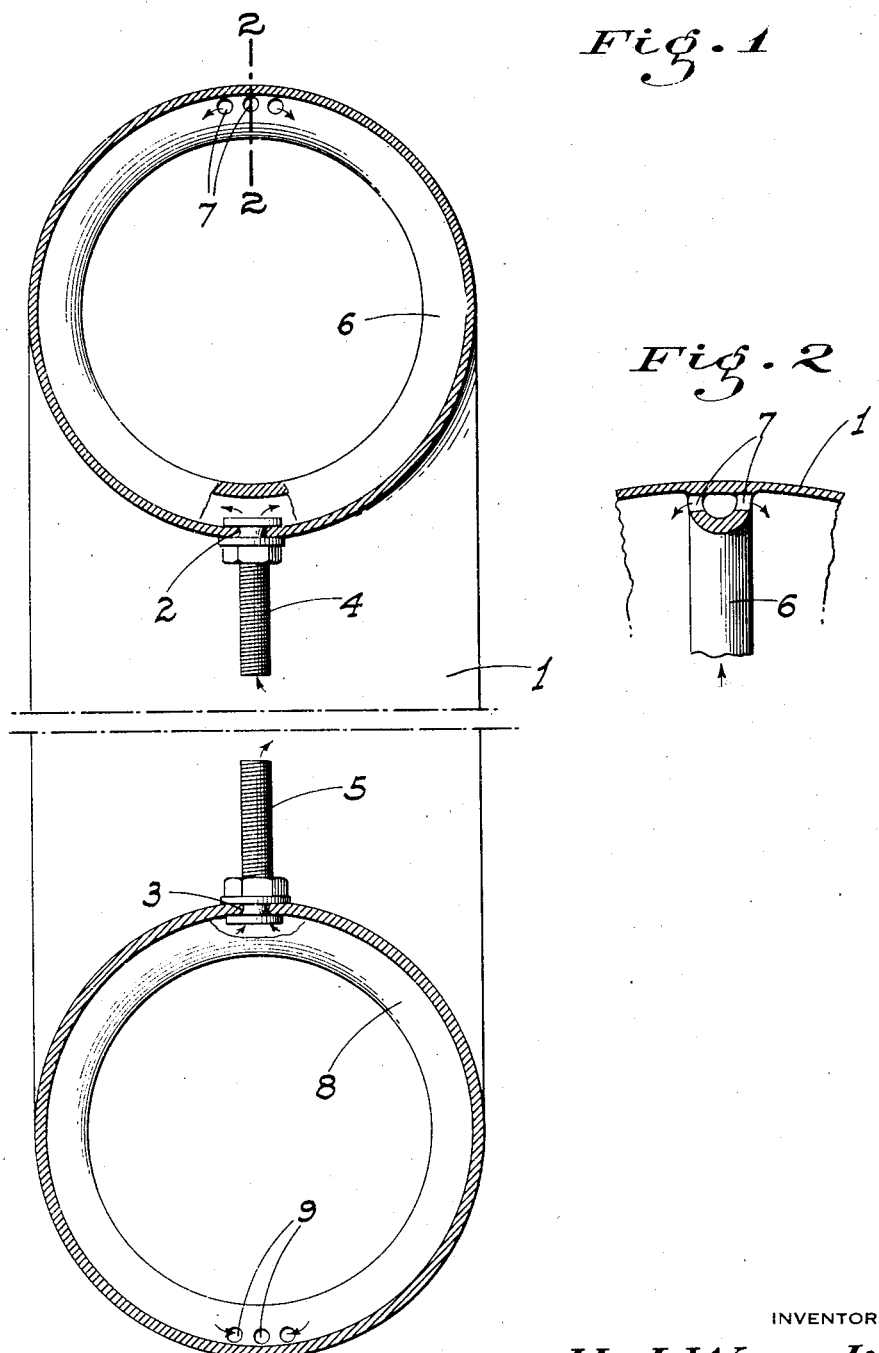
INVENTOR
H. J. Woock
BY
ATTORNEY

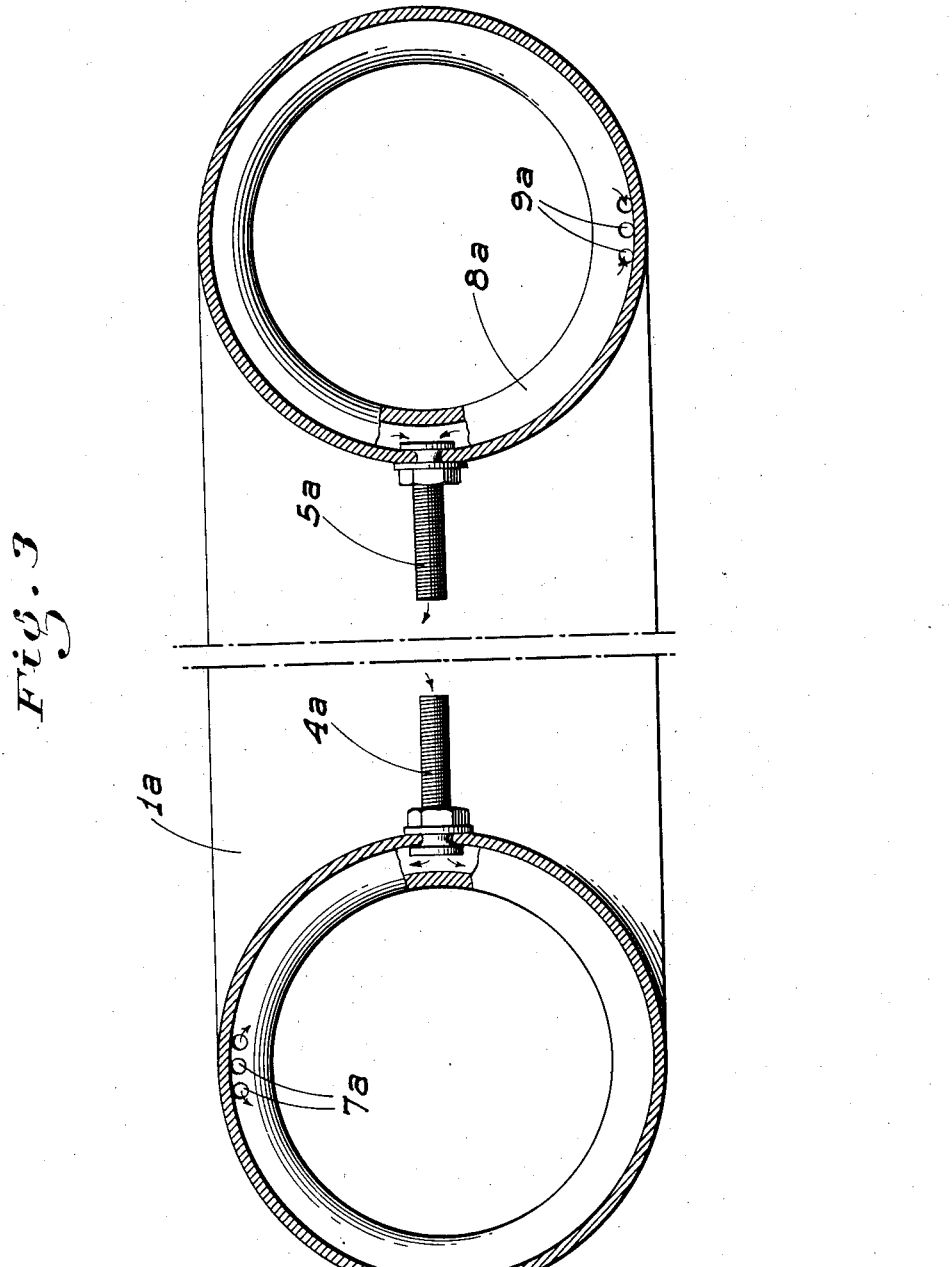

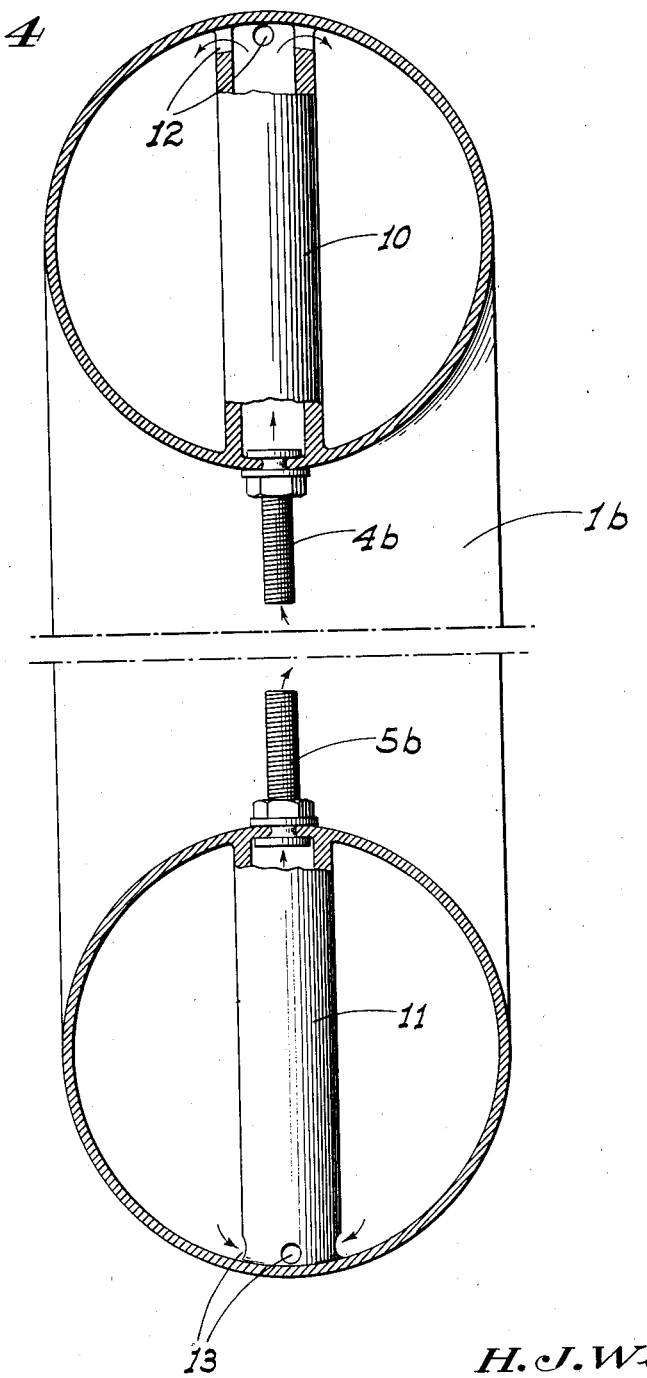

Aug. 29, 1933.  H. J. WOOCK  1,924,530
PRESSURE BAG FOR TIRE MOLDS
Filed June 30, 1931   4 Sheets-Sheet 4

INVENTOR
H. J. Woock
BY
ATTORNEY

Patented Aug. 29, 1933

1,924,530

UNITED STATES PATENT OFFICE 1,924,530

PRESSURE BAG FOR TIRE MOLDS

Herbert J. Woock, Lodi, Calif., assignor to Super Mold Corporation, Lodi, Calif.

Application June 30, 1931. Serial No. 547,815

6 Claims. (Cl. 18—45)

This invention relates to tire retreading with the use of a full circle mold, especially one of the vertical type such as that shown in my Patent No. 1,764,378 dated June 17, 1930.

In the use of a mold of this nature a flexible and expansible pressure bag is placed inside the tire, and in the interests of efficient results and speedy operation it has been found best to fill the bag with heated water or other liquid under pressure. This is done by suitable means, the system shown in my co-pending application, Serial No. 531729, filed April 21, 1931, being preferably used, since by this system the water is both injected into and ejected from the bag when desired.

With the ordinary type of intake and outlet tubes (such as the valve stems of tire tubes) applied to the bag at the top and bottom respectively, it was found that air was apt to be trapped in the top of the bag when the water was pumped in so that an air pocket was formed; and a certain amount of water inevitably remained in the bottom of the tire when the bag was being emptied while still in place in the tire casing, as is the usual method of procedure.

I have already recognized this objectionable feature and the adjustable tubular inlet and outlet passage members shown in said co-pending application were designed to overcome them. The proper adjustment however of these members required considerable care and good judgment, which was not always used by the operators. Also the insertion of the bag into the casing or the removal of the same from the casing, at which time the bag is in a deflated and limber condition, was apt to cause the inwardly projecting and unyielding passage members to cut into or chafe the bag as well as interfere somewhat with the ease of manipulation of the bag.

The principal object of my present invention therefore is to retain the advantages and eliminate the disadvantages of said rigid adjustable passage members, by the provision of flexible passages built into the bag and which yield with the flexing of the same; and so designed that the water can only flow into the bag at the topmost point and similarly will be discharged only from its lowest point. In this manner the formation of air pockets is avoided and all the water is positively withdrawn from the bag when it is being emptied. I am also able to use the ordinary form of intake and outlet nipples on the bag, which facilitate making the desired quick connection with the supply and discharge conduits of the water circulating and pumping system.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a transverse section of the bag adapted for use in a vertical type mold showing the preferred form of built-in intake and outlet passage members.

Fig. 2 is a fragmentary section on the line 2—2 of Fig. 1.

Fig. 3 is a view similar to Fig. 1 but showing the arrangement of the passage when the bag is intended for use in a horizontal type mold.

Fig. 4 is a fragmentary transverse section of a bag for a vertical type mold showing a modified form of passage arrangement.

Figure 5:
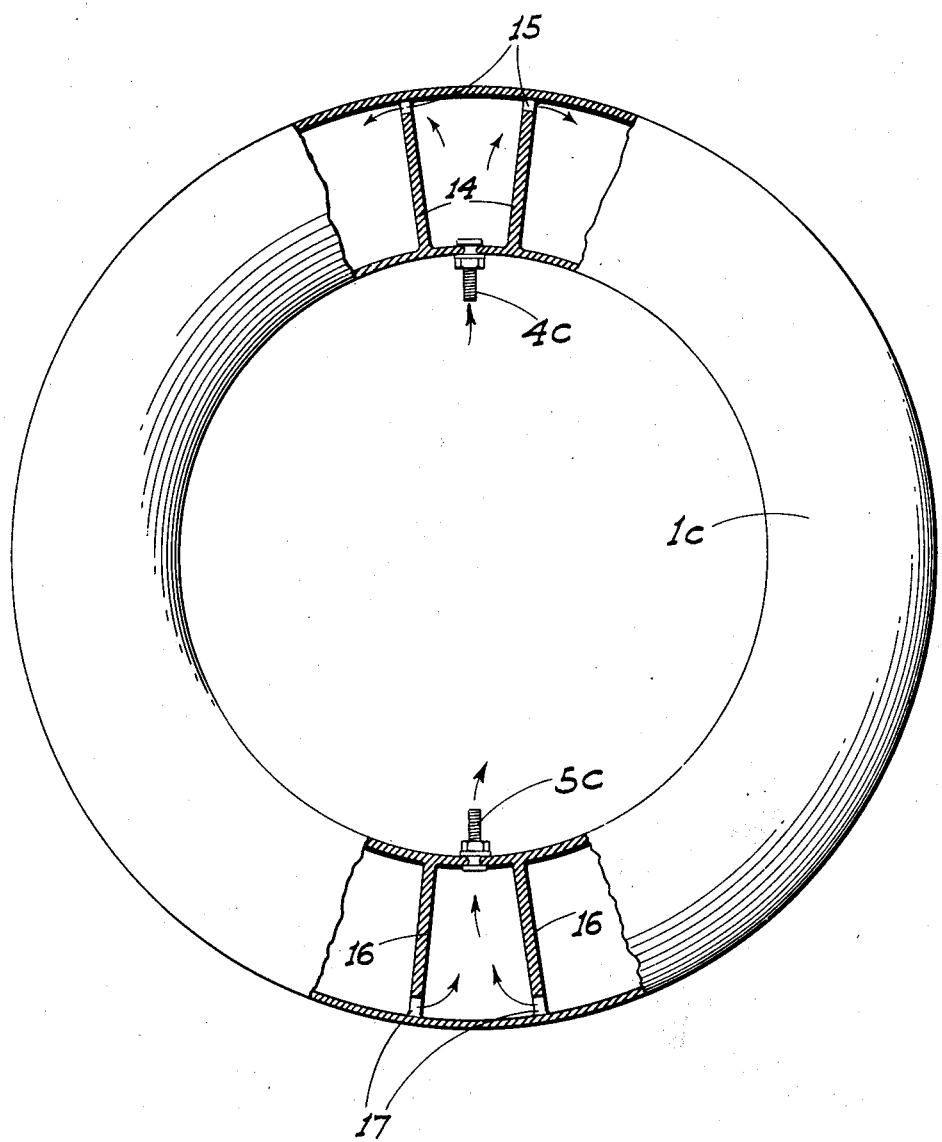
Fig. 5 is a side elevation of a bag partly in section showing still another modified form of passage.

Referring now more particularly to the characters of reference on the drawings and particularly at present to Figs. 1 and 2, the bag which is of a standard type in the form of an endless hollow annular ring. Said bag has intake and outlet openings 2 and 3 respectively at the top and bottom of the bag on its inner periphery. Outwardly projecting and radially extending stems or nipple 4 and 5 are mounted in permanent connection with the openings 2 and 3 respectively for connection to supply and discharge conduits. These nipples are similar to ordinary valve stems and only extend through the adjacent wall of the bag.

Extending transversely and radially of the bag at the top and following its inner contour is a flexible passage member 6, preferably of tubular form and vulcanized or built in the bag throughout its extent. At the bottom the passage communicates with the intake opening 2, and at the topmost point only is provided on its opposite sides with discharge openings 7. The water forced through the intake nipple can therefore only enter the bag at its highest point and the formation of air pockets is avoided.

A similar passage member 8 extends downwardly about the bag at the bottom from and communicates with the outlet 3. This passage has openings 9 on its sides and at the bottom communicating with the bag. By reason of this arrangement it will be seen that a complete discharge of water from the bag through the outlet nipple may be effected.

The above passage arrangement is for a bag designed for use in a vertical type mold in which the axis of the bag is horizontal and the bag stands upright. The bag shown in Fig. 3 is designed for use in a horizontal mold. In this case of course the axis of the bag 1a is vertical and the intake and outlet nipples 4a and 5a respectively are horizontally disposed and lie in a horizontal plane centrally of the height of the bag. Openings 7a from the intake passage 6a are not therefore disposed at the point of greatest radius of the bag, or opposite the intake nipple, but at what constitutes the top of the bag when it is in said horizontal position. Similarly the openings 9a of the outlet passage 8a are disposed at what is the lowest point of the bag when the latter is horizontal.

The bag 1b shown in Fig. 4 is designed for vertical type molds only. In this bag straight flexible tubular passages 10 and 11 extend radially of the bag from one side to the other in alinement with the intake and outlet nipples 4b and 5b and communicate at one end therewith. These passages are sealed at their opposite ends to the inner wall of the bag; the intake passage 10 communicating with the bag only at the top by means of suitable spaced openings 12, while the outlet passage 11 communicates with the bag only at the bottom by means of openings 13.

In the bag 1c shown in Fig. 5 the intake passage between the topmost point of the bag and the intake nipple 4c is formed by transversely extending partitions or walls 14 secured to or built into the bag and disposed on opposite sides of the nipple. Openings 15 through said walls at the top provide communication with the bag. Similarly the outlet passage communicating with the nipple 5c is formed of transverse partitions 16 having openings 17 therethrough only at the bottom.

All the above described forms of passage members are flexible and yield or flex without similar movements of the bag. No damage is therefore ever done to the bag and no interference with the manipulation of the same is had. It will also be noted that in all types of the passage members, it makes no difference in practice which is considered the intake and which the outlet. This is because the same relative position of the openings from the passages into the bag is had whether the bag is disposed in the positions described or is inverted. The openings into the bag being always in the right position for proper results, no adjustments on the part of the operator are necessary, and the obtaining of such proper results does not therefore depend on the judgment of the operator. It should be particularly noted that this bag is to be interposed in an air and water circulating system, so that as water under pressure is being forced into the bag through one nipple (whichever nipple is being used as the intake) the air is being forced out of the bag by the incoming water through the other nipple. The points of intake and outlet being at the highest and lowest points of the bag, no air pockets can form with the admission of water, and vice versa.

I claim:

1. An expansible annular bag having an opening in the inner periphery thereof, and a flexible passage member inside the bag and communicating with said opening; and said member being in the form of a tube disposed radially of the bag and extending from its inner to its outer periphery, and communicating with the bag only adjacent such outer periphery.

2. An annular expansible tube for the reception of a fluid vulcanizing medium, and being adapted to rest in a predetermined position when in use and being provided with an inlet and an outlet in its periphery, a flexible passage member in communication with the inlet and having an outlet at the highest point within the tube when the latter is in its predetermined position of use.

3. An annular expansible tube for the reception of a fluid vulcanizing medium, and being adapted to rest in a predetermined position when in use and being provided with an inlet and an outlet in its periphery, a flexible passage member in communication with the inlet and outlet respectively, that member which is in communication with the inlet having an outlet at substantially the highest point within the tube when the latter is in its position of use, and the other member having an inlet from substantially the lowest point within the tube when the latter is in such position of use.

4. An annular expansible tube for the reception of a fluid vulcanizing medium, and being adapted to rest in a predetermined position when in use, a flexible passage member within the tube and adhering to and following the inner cross sectional contour of the tube, one end of the passage member opening into the tube at a fixed point relative to the predetermined position of use of the tube and the other end having an opening through the side wall of the tube.

5. A structure as in claim 4 in which the walls of the passage member are formed integral with the wall of the tube.

6. A structure as in claim 4 in which the walls of the passage member are formed integral with the wall of the tube, and are of the same material as that of the tube.

HERBERT J. WOOCK.